Patented Apr. 20, 1937

2,078,041

UNITED STATES PATENT OFFICE 2,078,041

POULTRY VACCINE

Robert W. Terry, Columbus, Ohio

No Drawing. Application June 25, 1935,
Serial No. 28,358

5 Claims. (Cl. 167—53.1)

This invention relates to an improved biological product—a preventive vaccine for administration to domestic fowls, and has for its primary object the provision of a vaccine which is prepared in ointment form and containing a powdered live virus by which certain advantages in the manufacture, stabilizing and use of such a product are obtainable.

Fowl pox is a disease that has been recognized for a long time and is a known virus disease in domestic fowls. It affects chickens mostly on the combs and wattles, forming crusts which detach themselves after two or three weeks and after which the fowls become immune to the same contagion. Occasionally, the disease gets into the throat and in that case it is usually referred to as cankers or diphtheria, the latter condition sometimes causing the loss of the birds from strangulation. The skin type (comb and wattles), which is the most prevalent, is not usually fatal but interferes greatly with egg production. The natural occurrence of the disease is usually in the autumn when egg prices are the highest. The disease, therefore is of economic importance to the poultry industry. At the present time, there is no known medicinal preventive or cure for the disease. During the last few years, it has been found that fowls can be immunized against this disease by using a vaccine made from the lesions containing the live virus occurring on fowls suffering from the disease. Immunity apparently is only produced from a live virus.

This vaccine was originally made by taking the crusts from infected birds, dehydrating them and grinding them in glycerin or diluted glycerin. It was found that the virus deteriorated when in solution. The addition of preservatives to the liquid had a detrimental action on the virus. Therefore, it was more practical to market the virus in two separate containers, one container holding the regulated amount of ground dehydrated crusts in the form of a very fine powder while the other container held the diluting fluid, consisting usually of 10% to 20% glycerin or in some cases, distilled water. This diluted glycerin merely served as a distributing agent and had no favorable action on the virus. When ready for use, the finished vaccine was made by the poultry raiser by adding the powdered virus to the bottle of diluting fluid and shaking for a few minutes. This action produced a coarse suspension of the infective material.

Since immunity to fowl pox appears to be generated by the skin, it is now applied only to the skin rather than injected into the bird as at first. The usual method is to remove two or three feathers from the leg and apply a small amount of the suspension to these follicle openings, this procedure being known as the follicle method. After about ten or twelve days, evidence of crust formation is noticed at the site of inoculation and then between two and three weeks after inoculation, these crusts detach themselves from the bird and the latter will be immune to the natural disease, usually for the life of the fowl.

Certain disadvantages and inconveniences exist in the application of this liquid vaccine by the follicle method. The first is that it is rather time consuming to pull the feathers. Secondly, while the vaccination is being conducted, one is working for speed and the feathers are usually dropped on the ground and this, in some cases, develops the habit of feather eating among the fowls.

It has been recently discovered that a more convenient method could be used to effect these inoculations and this is known in the industry as the stick or stab method. It consists of taking a small sharp pointed knife and taping it (using ordinary surgical adhesive tape) close to the point so that only about one-sixteenth of an inch of the point is exposed. This taped knife point is then dipped into the liquid vaccine (combined powdered virus and diluent) and thrust into the skin of the fowl. No feathers need be pulled when this latter method is employed. The knife point breaks the skin and most of the liquid suspension is deposited in the broken skin from the liquid adherent on the adhesive tape. It is necessary to break the skin for the virus to produce a proper reaction or "take". The stab or stick method is becoming increasingly popular with poultrymen because it is possible to vaccinate many more birds in a given time with greater ease and convenience. However, the same objection exists to this method as to the follicle method because after the virus is mixed with the diluting fluid, it is subject to rapid deterioration. At the present time, it is not possible to produce a sterile virus (that is, free from bacterial contamination), because methods commonly employed for the destruction of bacteria would also affect the virus. This being the case, it is customary for the poultryman to use up all the vaccine in about twenty-four hours (after being mixed), this being the usual recommendation of the manufacturer of the vaccine.

Frequently, poultry farms have several broods of chicks of different ages being raised and, at the present time, it is felt that vaccination should be conducted on young birds but often the differences between the ages of the birds is such that it is not desirable to vaccinate all of them at one time. If a poultryman uses the regular liquid form of vaccine and has some left over, it must be destroyed as it will not retain its potency long enough to vaccinate the younger group when they become of proper age. Also, in the late summer or early fall, the poultryman may buy a few cockerels or other birds to be added to the flock. At the present time, the smallest commercial package of vaccine comprises one hundred doses, and he must buy this quantity to vaccinate only a few birds, with resulting waste of the balance of the vaccine.

In accordance with the present invention, I have produced, after considerable experimentation, an ointment form of vaccine. I have found that I can mix the powdered virus with a neutral sterilized ointment and that the mixture will retain sufficient potency for commercial use for a period of nine months to a year or more without spoilage. It is assumed that the lack of moisture in the dehydrated virus and in the dehydrated ointment base prevents decomposition (bacterial action, etc.). The only observed change taking place in the ointment vaccine being the slow dying of the virus. This slow dying of the virus also occurs in the unmixed powdered virus. This ointment is to be used by the so-called stick or stab method except that the knife point need not be taped. In practice, a small quantity of the ointment form of vaccine is squeezed from the metallic tube container on a small glass plate, a small amount taken up on the knife point and inserted into the skin of the fowl, sufficient ointment adhering to and deposited within the skin to produce the desired reaction.

In the manufacture of this vaccine ointment, I employ the following formula in substantially the proportions given.

The powdered chicken pox virus is produced by the present established method of inoculating the combs of young susceptible cockerels with a carefully selected strain of virus, harvesting the pox lesions after about two weeks, dehydrating in a partial vacuum, usually over calcium chloride in a desiccator. After several days, drying, the large crusts are reduced to a granular form and further dehydrated by the same method. After several days additional drying, the granular material is reduced to a suitably fine powder either in a sterile ball mill or by grinding in a sterile mortar with a pestle. A second crop of pox lesions are also collected about one week after the primary crop and all treated as above and mixed to produce the powdered virus.

At the present time, the ointment base consists of approximately 75% anhydrous wool fat and 25% refined petrolatum, blended in such ratio to give an approximate melting point of 108° F. (rise in capillary tube method). This ointment base is sterilized and dehydrated by heating in a sterile container to 140 degrees C. for 10 minutes. After the cooling of the ointment base, the powdered virus is thoroughly incorporated with the ointment base in the ratio of about one part powdered virus by weight to about 10 parts by weight of ointment base. The mixed ointment base and virus is then transferred in proper amounts to sterile collapsible tubes which after being properly closed and labeled, constitutes the commercial package.

It is obvious that other fats or ointment compositions can be used and also that other types of containers can be used for commercial distribution. Also other ratios of virus to ointment base can be used. When mixed in the above proportion, the average amount or dosage per fowl, at the present time, is approximately 1.2 milligrams of mixed ointment vaccine.

It has been experimentally determined that the virus when incorporated in the ointment base, remains potent for longer periods when the base has been neutralized with caustic potash before the virus is incorporated.

The advantages of this ointment form of vaccine over the liquid vaccine may be generally summarized as follows:

1. There is no delay, inconvenience or possibility of spilling powdered virus with the ointment form as with the liquid form, as it is already mixed and ready for instant use.

2. Since the ointment form of vaccine will remain potent without spoilage for a period of approximately one year, portions may be used at any time over a vaccinating season without loss and at different intervals.

3. It is less likely to contaminate poultry premises and clothes of the vaccinator; that is, with the liquid form of vaccine, small invisible dust particles of the powdered virus will be thrown into the air when the powdered virus is transferred to the liquid, since this operation is effected by the poultryman at the time of vaccination. Then again, when the liquid vaccine is being applied with the brush (follicle method), small droplets of the suspension are splashed or scattered through the air and onto the premises and clothes of the vaccinator.

4. In the case of liquid vaccine, both by the stab or particularly by the follicle method, it is possible to transmit diseases other than fowl pox among the birds being vaccinated. In pulling feathers for the follicle method, sometimes blood is drawn which comes in contact with the brush when the virus suspension is applied to the skin; then when the brush is dipped in the bottle of vaccine for the next bird, any infective agent that might be in the blood becomes thoroughly mixed in the bottle of virus suspension and this in turn would be spread to all birds vaccinated from this bottle. It is felt that chicken cholera has actually been transmitted among a flock by this previous process. In the case of the ointment, only small portions of it are picked up at the end of a thin strip deposited on a glass plate, and this method of application is such that any contamination getting into the ointment from the knife point would not be mixed with the entire quantity and in all probability be mechanically removed from the applicating knife on the next three or four birds, preventing any gross spread of an infection within a given flock.

5. The advantages to the manufacturer or the vaccine of the present invention reside in the facility and economy with which the vaccine may be produced. In order to make this vaccine, it is merely necessary to incorporate the powdered virus in a sterile ointment base and then place the same in a collapsible metallic tube. Only one container and one label is required for the commercial package. In the case of the liquid vaccine, it is necessary to weigh carefully the powdered virus into a small vial which is a tedious process, the individual vials must be labeled, stoppered and sealed which is a relatively costly process; the diluting fluid must be sterilized, transferred to sterile bottles. stoppered and sealed and a label applied on each of these containers. An applicating brush is a standard part of the package.

The present invention, therefore, provides a vaccine which while susceptible to economic and facile methods of manufacture, finds advantage in the fact that the poultryman or others who purchase such vaccine may readily use the vaccine as it is supplied by the manufacturer, without first mixing the same, as has been heretofore necessary. Not only is the poultryman afforded greater convenience but in addition to that, the ointment vaccine may be used at intervals over a prolonged period of time without loss of its effectiveness.

What is claimed is:

1. A fowl pox vaccine for intracutaneous administration comprising an ointment base containing therein an active filterable virus comprising the lesions of pox infected fowls.

2. A poultry vaccine for intracutaneous administration comprising an ointment base composed of anhydrous wool fat and petrolatum having a melting temperature approximately that of the blood temperature of poultry, the said ointment having incorporated therein a live virus comprising a powdered dehydrated substance constituting the pox lesions of infected fowls.

3. As a new composition of matter for intratissue administration to fowls, a vaccine in ointment substantially anhydrous for commercial stability containing the live filterable virus of fowl pox.

4. As a new composition of matter for intracutaneous administration, a vaccine in ointment form substantially anhydrous for commercial stability containing the specific live pox virus of the domestic barnyard chicken (*Gallus domesticus*) commonly called chicken pox.

5. A poultry vaccine for intracutaneous administration and substantially anhydrous for commercial stability, comprising an ointment base having a melting temperature approximately that of the blood temperature of poultry, the said base having incorporated therein a live virus comprising the powdered dehydrated substance constituting the pox lesions of infected fowls.

ROBERT W. TERRY.